(No Model.)

J. B. LOW.
ELECTRICAL CONNECTION FOR RAILWAY TRAINS.

No. 258,859. Patented May 30, 1882.

WITNESSES.
C. J. Mattison.
Addison Low

INVENTOR.
Jesse B. Low,
by William H. Low,
Attorney.

UNITED STATES PATENT OFFICE.

JESSE B. LOW, OF PULASKI, NEW YORK, ASSIGNOR OF ONE-HALF TO FRANK S. LOW, OF SAME PLACE.

ELECTRICAL CONNECTION FOR RAILWAY-TRAINS.

SPECIFICATION forming part of Letters Patent No. 258,859, dated May 30, 1882.

Application filed March 1, 1882. (No model.)

*To all whom it may concern:*

Be it known that I, JESSE B. LOW, of Pulaski, in the county of Oswego and State of New York, have invented certain new and useful Improvements in Electrical Connections for Railway-Trains, and for other purposes, of which the following is a full and exact description, reference being had to the accompanying drawings, which form a part of this specification, and in which—

Figure 1:
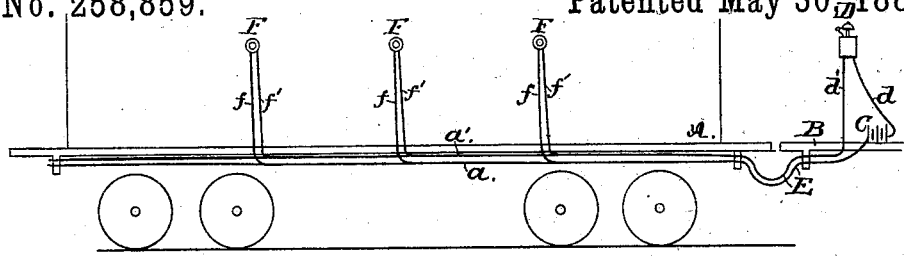
Figure 2:
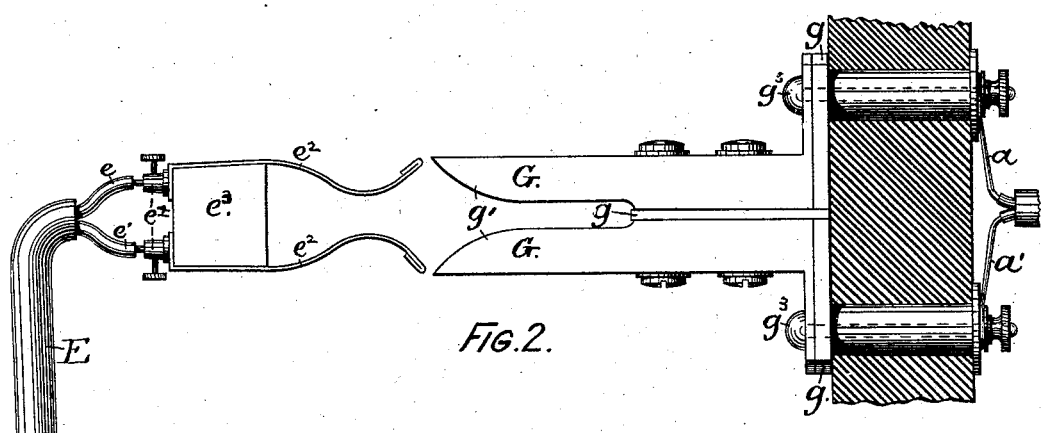

Figure 1 is a skeleton outline of a car and part of the engineer's cab of a locomotive-engine, showing the general arrangement of the parts of my invention as applied to a train; Fig. 2, a plan view of my device for forming electrical connections with the removable connecting portion separated from the permanent or fixed attachment; and Fig. 3, a horizontal section of Fig. 2, showing the separable and permanent portions of the coupling device coupled together.

My invention relates to improvements in the construction of electric signaling-lines upon railway-trains for the purpose of converging electric signals from any of the cars composing the train to the engineer in charge of the motive-power of the train, whether such signals are produced by either automatic or manual means.

For the purpose of effectuating my invention I use the "open-circuit" electric system, and to this end I place a Leclanché or other suitable galvanic battery on some convenient part of the locomotive-engine, and at some suitable part of the engineer's cab that is adjacent to the battery I fix a single-stroke electric alarm-bell of the ordinary construction, which alarm-bell is connected in the usual manner to the aforesaid battery and to two lines of conducting-wires running in, on, or beneath the cars, and for the said lines of conducting-wires I preferably use a lead-covered cable containing two electrical conductors that are thoroughly insulated from each other and from the lead covering of the cable; but it is obvious that any other mode of constructing such lines, either by separate and distinct lines of conducting-wires or any different form of cable, may be employed for the same purpose. The conducting-wires for the train are coupled together between the conjoining cars by means of flexible cables containing two insulated electric conductors and provided with the electric coupling device, hereinafter described. In or on each car, at such points as are convenient and accessible, one or more open-circuit push-buttons are fixed in place, and their conducting-wires are connected in the usual manner to the conducting-wires running through the train, and by means of said push-buttons any signal according to any prearranged code may be delivered on the alarm-bell for the engineer on duty.

As illustrated in the drawings, A represents the body of a car, having electrical conductors $a$ and $a'$ strung beneath it; B, a portion of the engineer's platform or cab of a locomotive-engine, having a Leclanché or other suitable battery, C, and electric alarm-bell D fixed thereto; $d$ and $d'$, electric conductors leading from the bell D to the under side of the platform B; E, flexible electric conductors for forming the necessary separable electric connections between the lines of electrical conductors running through the different cars of the train; and F, push-buttons electrically connected by the wires $f$ and $f'$ to the electrical conductors $a$ and $a'$ in such manner that the circuit through those conductors may be closed by pressing in the push-button to produce a stroke on the alarm-bell D, and thus convey to the engineer in charge the required signal. This part of my invention, it will readily be seen, constitutes an electrical alarm-signal apparatus adapted to be operated by means of an open circuit through a series of connectible electrical conductors—one of such series being run through each car in the train—that are flexibly connected between the conjoining cars, so as to produce a continuous line through the entire train, and which may be disconnected between the several cars when occasion requires.

Figure 3:
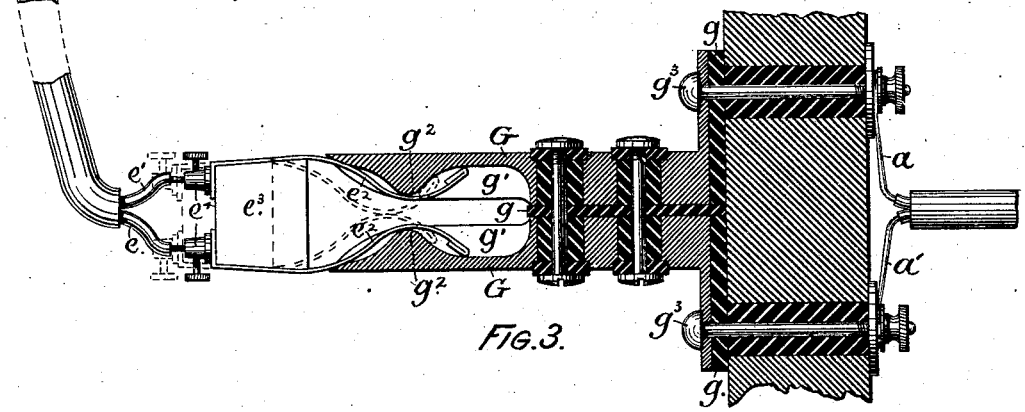

As illustrated in Figs. 2 and 3 of the drawings, my automatic alarm-coupling for connecting the flexible electric conductors E between the cars to the fixed lines of electric conductors running through each car consists of a fixed portion rigidly attached in some convenient place to each end of a car, and a separable portion attached to each end of the flexible conductor E. The fixed portion of the said coupling is composed of two like metallic conducting-pieces, G, that are insulated from each other and from the car by means of filling-pieces $g$, of hard rubber or other non-electrical material. Each of said conducting-pieces is provided on its inner face with a groove formed by the top and bottom flanges $g'$, and each groove contains near its outer end a raised projection, $g^2$, so arranged that when the two conducting-pieces G are in position, as shown in Fig. 3, a contracted throat is formed between the projections $g^2$, for a purpose hereinafter set forth. The conducting-pieces G are secured in place by means of the holding-bolts $g^3$, which are insulated from the car, and to which the electric conductors $a$ and $a'$ are connected, so as to form a metallic contact therewith and perfect the electric continuity through the conducting-pieces G and the conductors $a$ and $a'$. The separable portion of the aforesaid alarm-coupling consists of the flexible electric conductor E, (which is shown broken into two parts in Figs. 2 and 3,) composed of two insulated electrical conductors, $e$ and $e'$, inclosed in a covering of india-rubber or other suitable flexible material. The flexible conductor E is provided at each end with two metallic springs, $e^2$, which are separated from each other by means of an insulating-block, $e^3$, of hard rubber or other proper substance. Each of said springs has at its inner end a binding-post, $e^4$, and to these binding-posts the conducting-wires $e$ and $e'$ are attached in such manner as to perfect the required electrical continuity through the said flexible conductor to the outer ends of both pairs of the springs $e^2$. The parts of the springs $e^2$ projecting beyond the insulating-block $e^3$ are bent into an ogee form and so that the outer ends of them will diverge from each other, as shown in Figs. 2 and 3.

To connect the electrical conductors $a$ and $a'$ of each car so as to form a continuous line of said conductors from the engine through the entire train, the springs $e^2$ at one end of the flexible coupling-conductor E are slipped endwise into the grooves formed in the fixed conductive pieces G at one end of a car, and in a like manner the springs $e^2$ at the opposite end of the same flexible coupling-conductor E are attached to the pieces G fixed to the conjoining end of the next car; and it will be observed that in inserting the springs $e^2$ into the grooves of the conductive pieces G, while passing the projections $g^2$, the two springs $e^2$ will be forced together, (as indicated by the dotted lines in Fig. 3,) and thereby the circuit will be closed to sound an alarm on the bell D and give notice of the fact to the engineer; and whenever the springs $e^2$ are drawn out of the conductive pieces G, whether such an act is done accidentally or purposely, the circuit will in a like manner be closed to sound the bell D, and in this manner the engineer will be automatically notified of the fact every time any part of the line is connected or disconnected.

It is obvious that my device for connecting and disconnecting the lines of electrical conductors can be readily applied to many different uses beside the one herein described.

I claim as my invention—

1. In an organized system of electrical conductors attached to the cars of a railway-train for the purpose of signaling the engineer in charge of the train, the combination, with the electrical conductors $a$ and $a'$, fixed to each car and adapted to connect and disconnect by means of the fixed conducting-pieces G and the flexible conductors E, provided with the metallic springs $e^2$, constructed and arranged to operate as set forth, and one or more push-buttons, F, fixed in or on the cars, and electrically connected to the conductors $a$ and $a'$, as herein described, of the battery C and alarm-bell D, fixed on the engine of the train, as and for the purpose specified.

2. In an open-circuit system of electric conductors, the combination, with the conductive pieces G, provided with the projections $g^2$, as herein described, of separable conductors provided with springs $e^2$, adapted to engage in the pieces G in such manner that a closing of the open circuit will be automatically effected by every engagement and disengagement of said springs with the pieces G, in the manner herein specified.

3. The device herein described for connecting and disconnecting the lines of open-circuit electric conductors, composed of the conductive pieces G, containing the projections $g^2$ and insulated from each other, as herein set forth, and the springs $e^2$, insulated from each other and adapted to engage with the pieces G in such manner that the open circuit will be momentarily closed every time the said springs are connected to or disconnected from the said pieces G, as herein specified.

JESSE B. LOW.

Witnesses:
WILLIAM H. LOW,
M. MATTISON.